Figure 1:
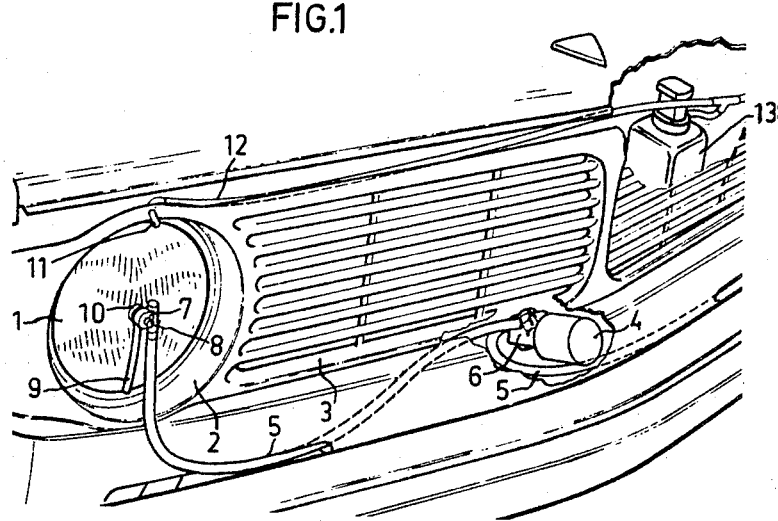

United States Patent [19]
Ahlèn

[11] 3,736,617
[45] June 5, 1973

[54] DEVICE FOR CLEANING THE GLASS ON VEHICLE HEADLIGHTS

[75] Inventor: Dan Ragnar Ahlèn, Ockero, Sweden

[73] Assignee: Aktiebolaget Volvo, Gothenburg, Sweden

[22] Filed: July 19, 1971

[21] Appl. No.: 163,875

[52] U.S. Cl..............................15/250.22, 15/250.17
[51] Int. Cl................................B60s 1/20, B60s 1/44
[58] Field of Search.....................15/250.22, 250.17, 15/250.16, 250.01, 250.25

[56] References Cited

UNITED STATES PATENTS

| | | | |
|---|---|---|---|
| 3,493,804 | 2/1970 | Fennell | 15/250.01 X |
| 3,608,123 | 9/1971 | Champigny | 15/250.22 |
| 3,649,990 | 3/1972 | Saito | 15/250.22 |

FOREIGN PATENTS OR APPLICATIONS

| | | | |
|---|---|---|---|
| 676,967 | 12/1963 | Canada | 15/250.01 |
| 533,606 | 2/1941 | Great Britain | 15/250.22 |
| 593,246 | 10/1947 | Great Britain | 15/250.22 |

*Primary Examiner*—Peter Feldman
*Attorney*—Irvin S. Thompson and Robert J. Patch

[57] ABSTRACT

The present invention relates to a device for cleaning the glass of a vehicle headlight. The device comprises a gear box placed in front of the glass and having a shaft supporting a rotatable wiper blade. The gear in the gear box is operated by a motor via a flexible cable. The device is chiefly characterized in that the motor is arranged to operate the cable at a high speed, that the worm gear in the gear box is arranged to provide in one step the reduction required to produce a speed of rotation suitable for the wiper blade, and that a stopper rotating synchronously with said wiper blade is provided to actuate the motor to stop said wiper blade in a predetermined fixed position. The shaft of the gear box is journalled in a boss, or the like, which is glued or otherwise secured on the outside of the glass.

4 Claims, 2 Drawing Figures

PATENTED JUN 5 1973

3,736,617

DEVICE FOR CLEANING THE GLASS ON VEHICLE HEADLIGHTS

The present invention relates to a device for cleaning the glass of a vehicle headlight. More and more attention has been drawn lately to the risks involved when the headlight glass becomes covered with a layer of dirt while the vehicle is being driven in rain, snow and on wet roads so that the amount of light given off by the headlight is substantially reduced. In order to keep the glass somewhat clean, irrespective of road conditions, different solutions have been proposed for wiping the glass clean, e.g. by rotating wiper blades. However, various difficulties arise in the installation and operation of such units. In certain cases, the entire headlight must be replaced with special built-in means for operating the wiper blade. In other constructions, the apparatus is so bulky that it greatly decreases the effectiveness of the headlight. Devices mounted on the front part of the vehicle are always exposed to damage. Therefore, it is essential that the apparatus be, as much as possible, mounted behind existing protective plates.

In order to be functional, the cleaning device ought to be mountable on headlights of hitherto common types without greater intrusion upon or exchange of parts, and the construction should be robust and reliable in operation. The effect of the light given off when the device is not in operation must not be greatly reduced, particularly when the low beam is on. It is also essential that the wedge-shaped sector on the glass for asymmetric light is not obscured.

The present invention relates to a cleaning device which fulfills these demands. No intrusion need be made on the standard headlight, since the device can be secured on the outside of the glass or suspended in a console. The effectiveness will be high since the fundamental parts passing over the glass are narrow and, when not in use, are positioned so as not to obscure the low beam at all and the high beam only insignificantly. A flexible cable has been previously used as driving means between a motor and a gear drive placed on the outside of the glass. However, since the gear ratio between the motor and the wiper blade is, of necessity, great, an extra gear had to be provided, whereby the speed of the cable is reduced. At the same time, the transferred torque in the cable increases. Therefore, the cable must be made thick and since the gear drive will thereby also be large, the device has proved to take up too much space and considerably reduces the effect of the light given off by the headlight.

According to the invention, the drive motor is arranged to operate the cable with high rotary speed. A worm gear in the gear box in front of the headlight glass is arranged to provide in one step the required reduction to a rotary speed suitable for the wiper blade. A stopper rotating in synchronization with the wiper blade is provided to actuate the motor to stop the wiper blade in a predetermined fixed position. Since the cable thereby only needs to transfer a small torque, it may be slender. Despite this, the use of a spring system is not required; the wiper blade can be stopped in an accurate fixed position.

The wiper blade ought to rotate at approximately 50 rpm and if the motor runs at 1000 rpm, the gear ratio will be 20:1. The device can be suitably combined with means for squirting water on the glass and may be connected in such a manner that it is actuated simultaneously with the windshield wiper. To prevent the wiper blade from obscuring the light when not in use, it extends in only one direction from the centre of the headlight and, when in neutral position, extends straight downwards. Since the cable is also preferably pulled vertically up to the gear, the device obscures only the least possible light.

Figure 2:
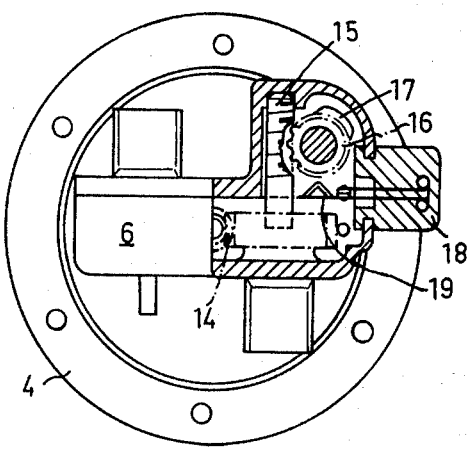

The invention will now be described with reference to the enclosed drawings. FIG. 1 is a perspective view of the front part of a car having a device according to the invention for cleaning the glass on a headlight. FIG. 2 is a partially sectioned end view of a driving motor for the device.

The headlight 1 has the usual circular shape with convex glass and is mounted in the bottom of a rim 2 punched out of a plate 3 which forms the vehicle's radiator grill. The shape and mounting of the headlight can vary within certain limits. Thus the glass need not be circular; another shape, e.g. annular, is conceivable. An electric motor 4 is placed midway between the two headlights 1 and behind the radiator grill 3 or inside the engine house. A flexible cable 5 extends to each headlight. A pinion gear 6 is thus attached to the drive shaft of the motor 4 and, in case the rpm is very high, a reduction gear 14 may be combined with said pinion gear 6. The cable 5 is enclosed by a flexible sleeve and is pulled behind the radiator grill to the bottom edge of the rim 2 so that the greater part of it is protected from damage. A worm screw is mounted at the end of the cable 5 and engages a worm wheel. The entire worm gear is built into a housing 7. The worm wheel has a shaft 8 projecting out from the housing 7. A wiper blade 9 pointing in one direction only is fixed on said shaft and is pressed firmly against the headlight glass by a resilient member. The edge of the wiper blade resting against the glass may consist of a strip of rubber or the like. The wiper blade 9 can in principle be constructed similar to a conventional windshield wiper blade. The gear ratio of the worm gear is preferably selected so that the wiper blade 9 rotates at about 50 rpm when the rpm of the cable is 1000. The shaft 8 is journalled in a boss 10, or the like, which may be glued or otherwise secured in the middle of the headlight glass 1 without special fastening means being required. The boss 10 supports the housing 7 and the end of the cable. The cable 5 is drawn vertically and radially in towards the middle of the glass in order to obscure as little light as possible and the wiper blade 9 is positioned essentially vertically downward, when not in use, behind the cable 5. To keep the idle position of the wiper blade constant, the motor is provided with a stopper which rotates synchronously with the blade. Because of the insignificant torque in the cable 5, there is no spring action in said cable. Therefore, the blade always stops in the same position.

The stopper may be e.g. a worm gear having the same gear ratio as that of the worm gear for the wiper blade, and it comprises a screw 15 which is journalled in the housing of the pinion gear 6 and on the shaft that drives the cable 5. Thus, the stopper rotates at the same speed as the cable. The stopper also consists of a worm wheel 16 meshed with the screw 15. A radially extending cam 17, or the like, is fixed to the shaft of the worm wheel 16. A circuit breaker 18 for current to the motor 4 is attached to the gear box and has a resilient electric contact tongue 19 which is actuatable by the cam 17 and breaks the current when the cam 17 deflects it out of contact. Because of the inertia of the rotor in the motor 4, the cam 17 does not stop immediately; instead it rotates somewhat after the current break. Therefore, the cam 17 has a certain portion with a constant height along the circumference so that the current is definitely cut off when the cam stops.

In order to actuate the wiper, a lead-in shunted with the circuit breaker may be drawn to the dashboard of the vehicle and the current through the lead-in to the motor 4 can be conducted past the circuit breaker 18 until the motor has rotated the cam to the extent that the contacts of the circuit breaker have been closed. The motor is kept in operation until the cam 17 has rotated one turn and stops in its predetermined position.

The motor 4 can be switched on concurrently with the windshield washer but connection may also take place when, preferably, the headlight glass has become dirty. To increase the effectiveness of the device, it may be combined with a washing aggregate whereby washer fluid can be taken from the vehicle's windshield washer or from a separate washing system. Thus, a nozzle 11 is placed in the rim 2 at the upper edge of the glass 1. A lead-in 12 runs from the nozzle 11 to a container 13 having a motor-driven pump which may be connected so that it is actuated concurrently with the motor 4.

The cleaning device according to the invention can effectively keep the headlight glass free of dirt and, since no small parts obscure the upper half of the glass, the low beam will not be affected. Moreover, because of the small dimensions of the components, the effect of the high beam will not be significantly reduced.

Different variations are possible within the framework of the invention. The gear box and the wiper can be supported by a console which is secured in position outside of the periphery of the headlight and extends in towards the centre of the periphery. Other components may also be designed differently from what has been shown and described above.

What is claimed is:

1. A device for cleaning the glass of a vehicle headlight, comprising a gear box in front of the glass, a rotatable shaft in the gear box supporting a rotatable wiper blade, a gear in the gear box driven by a motor via a flexible cable, the motor driving the cable at high rpm via a distributor gear, a worm gear in the gear box providing in one step the reduction required to produce a speed of rotation suitable for the wiper blade, and a stopper rotating synchronously with said wiper blade and mounted in the vicinity of the motor and actuating the motor to stop said wiper blade in a predetermined fixed position.

2. A device as claimed in claim 1, said wiper blade in said predetermined fixed position extending down from said shaft.

3. A device as claimed in claim 1, said rotatable shaft carrying said worm gear.

4. A device as claimed in claim 1, said gear box being adhesively secured to the outside of the glass of the headlight, said glass being imperforate adjacent said gear box.

* * * * *